(12) United States Patent
Iwema et al.

(10) Patent No.: US 8,381,133 B2
(45) Date of Patent: *Feb. 19, 2013

(54) ENHANCED ON-OBJECT CONTEXT MENUS

(75) Inventors: Marieke Iwema, Seattle, WA (US);
Leroy B. Keely, Portola Valley, CA (US); David Switzer, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 369 days.

This patent is subject to a terminal disclaimer.

(21) Appl. No.: 12/545,397

(22) Filed: Aug. 21, 2009

(65) Prior Publication Data

US 2009/0309849 A1    Dec. 17, 2009

Related U.S. Application Data

(63) Continuation of application No. 11/413,184, filed on Apr. 28, 2006, now Pat. No. 7,581,194, which is a continuation of application No. 10/207,071, filed on Jul. 30, 2002, now Pat. No. 7,058,902.

(51) Int. Cl.
*G06F 3/048* (2006.01)
(52) U.S. Cl. ......... 715/845; 715/817; 715/825; 715/841
(58) Field of Classification Search .......... 715/708–711, 715/808, 811–814, 817, 825, 841, 845
See application file for complete search history.

(56) References Cited

U.S. PATENT DOCUMENTS

| | | | | |
|---|---|---|---|---|
| 5,485,175 | A * | 1/1996 | Suzuki | 715/841 |
| 6,337,698 | B1 * | 1/2002 | Keely et al. | 715/823 |
| 6,429,846 | B2 * | 8/2002 | Rosenberg et al. | 345/156 |
| 2003/0132911 | A1 * | 7/2003 | Narioka et al. | 345/156 |
| 2004/0243943 | A1 * | 12/2004 | Matsumoto et al. | 715/841 |

* cited by examiner

*Primary Examiner* — Ba Huynh
(74) *Attorney, Agent, or Firm* — Shook Hardy & Bacon L.L.P.

(57) ABSTRACT

Aspects of the present invention provide context menus useful in, e.g., a computing device receiving user input via a stylus. Icons representing actions performable on an object are displayed in a context menu for the object. Additional aspects of the invention include cascading menus that also minimize hand and/or wrist motion, as well as placement of menus based on user handedness and/or stylus orientation.

19 Claims, 15 Drawing Sheets

Sales for April

| | Product A | Product B | Product C (?) | | | | | | | |
|---|---|---|---|---|---|---|---|---|---|---|
| Salesperson 1 | $1003.01 | $501.33 | $1... | | | | | | | $34.11 |
| Salesperson 2 | $2100.10 | $234.50 | $2000.00 | | | | | | | $923.13 |
| Salesperson 3 | $1755.47 | $771.79 | $852.21 | | | | | | | $91.11 |
| Salesperson 4 | $909.43 | $924.94 | $994.53 | • | • | • | • | • | • | • |
| • | • | • | • | • | • | • | • | • | • | • |
| • | • | • | • | • | • | • | • | • | • | • |
| • | • | • | • | • | • | • | • | • | • | • |
| • | • | • | • | • | • | • | • | • | • | • |
| • | • | • | • | • | • | • | • | • | • | • |
| • | • | • | • | • | • | • | • | • | • | • |

FIG. 8

ENHANCED ON-OBJECT CONTEXT MENUS

FIELD OF THE INVENTION

This application is a continuation of U.S. patent application Ser. No. 11/413,184 (filed Apr. 28, 2006), now issued as U.S. Pat. No. 7,581,194, the contents of which are incorporated by reference herein, which is a continuation of U.S. patent application Ser. No. 10/207,071 (filed Jul. 30, 2002), now issued as U.S. Pat. No. 7,058,902, the contents of which are incorporated by reference herein.

FIELD OF THE INVENTION

This invention relates to an enhanced user interface for performing actions regarding information displayed on the screen of a computer or other electronic device. In particular, this invention relates to methods, systems and user interfaces for using context-specific menus to perform actions pertaining to a particular object having a corresponding screen representation.

BACKGROUND

Computers (including lesser electronic devices with limited computational abilities) are now part of everyday life. Until recently, however, the tasks for which computers could practically be used was sometimes limited by the manner in which a user could input information. Although there are numerous devices with which a computer user can provide input to a computer, many of these devices (e.g., keyboards, mice, trackballs, touchpads, etc.) have limitations and are not well-suited for some circumstances. Note-taking is but one example. Many individuals lack the typing skills to contemporaneously take notes by typing on a keyboard. Moreover, many persons find it difficult to simultaneously use a keyboard and devote attention to other matters, such as participation in a meeting. Conversely, most people can take handwritten notes while participating in such activities, and can do so rather quickly. Many people also take notes by combining written language with drawings, sketches, diagrams, symbols, etc. Keyboards, mice, touchpads, trackballs and various other traditional user input devices are not conducive to such activity. Moreover, keyboards, mice and trackballs generally require a surface upon which to rest the input device (and usually the computer), and are thus ill-suited to situations where a user may be standing or frequently moving from place to place.

An input device and technique that addresses these and other problems mimics traditional pencil (or pen) and paper. Specifically, certain devices allow a user to create images by moving a stylus across a display screen. Using the stylus (or a "pen") as a writing instrument, the user creates a graphical image of handwriting, symbols, drawing figures, or anything else that can be drawn with pencil and paper. The electronic ink created with the stylus may be maintained or stored in the graphical form in which it is created, such as a drawing, handwritten notes, etc. The ink may also be converted to another form. For example, various application software is able to recognize or interpret the electronically handwritten letters, words, etc. and substitute text for the electronic "ink." These devices and associated recognition software offer the convenience and intuitive nature of pencil and paper combined with electronic storage, editing, copying and other advantages of a computer.

As with other input schemes, however, a user of a pen-based computer will need to execute various commands, make menu choices, and perform numerous other activities beyond the simple creation of handwriting or drawing figures. For example, and similar to input using a mouse or keyboard, a user may need to specify font, color, type, paragraph style, or other text characteristics; may need to specify a predetermined drawing shape such as a line, rectangle, circle, arrow, flow chart box, or other frequently used shape; may need to save an object on the display into a file; may need to open a new file; may need to cut or copy a portion of a displayed object, or paste something previously cut or copied; may need to highlight or erase a portion of a screen object; or may need to perform numerous other commands or actions. In many graphical user interfaces, icons or drop-down textual menus are provided at the top of the screen, at the side, or elsewhere on a screen. To execute one of the commands corresponding to an icon or textual menu item, the user typically positions a cursor over the icon or menu item, and signals a choice (by, e.g., pressing a mouse or pen button).

Another format for presentation of possible commands is the context menu. Context menus are described in U.S. Pat. No. 5,664,133. Instead of moving the cursor to a main toolbar or menu, a user positions the cursor on (or near) an on-screen object (e.g., a text word, paragraph or other text block; a drawing figure; an image; a control interface; etc.) and indicates that a set of menu items specific to that object is desired. This indication can occur via the user pressing a particular button on a pointing device (e.g., pressing a right mouse button instead of a left mouse button). A context menu is then made available to the user that contains commands and actions (or shortcuts to commands and actions) that pertain to the object in question. The context menu may be displayed near the object in question.

Context menus can potentially solve certain problems associated with pen-based computers. When used for pointing, and unlike a mouse (which is a relative pointer), a stylus is an absolute pointer. A user is therefore often required to move his or her entire arm to navigate across a screen, not just the fingers or wrist (as is the case with a mouse). A stylus may thus require more movement than a mouse to achieve the same distance on the screen, resulting in faster hand and arm muscle fatigue. Context menus offer a way of minimizing required stylus travel and reducing fatigue.

Until now, however, the potential benefits of context menus have been undercut by differences between pointing with a stylus and pointing with a mouse. For example, it is generally more difficult to target a screen object with a stylus-moved cursor than with a mouse-moved cursor. A mouse typically moves across a desktop or other stable work surface, and the user's hand and arm are often resting on the same work surface. It is therefore easy to make small, controlled cursor movements. Conversely, a user typically holds a stylus above a tablet with less support and stability, making small controlled movements more difficult. Moreover, selecting a screen object by clicking with a mouse button is generally a pure vertical movement with one finger; the user can easily separate button-clicking finger movements from cursor-moving hand movements. With a stylus, however, a user may use the same arm, wrist, hand, and finger muscles to both move the cursor (by moving the stylus tip) and select a screen object (by, e.g., maintaining the cursor in a location or making a gesture). Even if a separate button is provided on the stylus, use of a stylus button is likely to cause the stylus tip, and thus the cursor, to move slightly. A stylus-controlled cursor may also be more difficult to see than a mouse-controlled cursor. Unlike a mouse, a stylus typically requires a user to rest his or her hand on the display screen, potentially obscuring the cursor location.

To overcome the targeting and visualization difficulties of a stylus, it is often desirable to increase the target size for a screen object. By way of hypothetical example, a screen display for particular object may have a target size for mouse-controlled cursor selection of 5 pixels by 5 pixels. To facilitate use of a stylus input device, the target size of that object might be increased to 10 pixels by 10 pixels. In other words, selecting the object in an environment designed for a mouse-controlled cursor requires placement of the cursor into a 5×5 square, while selection in an environment designed for stylus selection only requires placement of the cursor in a 10×10 area.

However, increasing object selection target size conflicts with the goal of minimizing stylus movements across the screen. As targets become larger, more screen space is needed to display multiple targets, and more distance must be traversed across the screen. With regard to context menus, the number of menu selections that can be presented in a context menu is thereby limited. Using conventional context menus with menu choices sized for stylus selection, studies have shown that more than seven menu items requires undesirable hand or wrist motion.

Accordingly, there remains a need for systems, methods and user interfaces that provide improved context menus for pen-based user input.

SUMMARY

Aspects of the present invention provide solutions to one or more of the problems highlighted above. Aspects also relate to methods and systems for selecting actions that can be performed with regard to an object having an associated representation on the display screen of a computer. Among other features, aspects of the invention allow display of icons, representing actions performable on an object, in a context menu for the object. By presenting context menu choices in the form of icons, it is possible to minimize hand and/or wrist motion by a user making menu selections with a stylus user input device. Additional aspects of the invention include cascading levels of context menus that also minimize hand and/or wrist motion, as well as placement of menus based on user handedness and/or stylus orientation. Further advantages and features of the invention are set forth in the detailed description, or will be apparent to persons skilled in the art in light of that description.

BRIEF DESCRIPTION OF THE DRAWINGS

The foregoing summary is better understood when read in conjunction with the accompanying drawings, which are included by way of example, and not by way of limitation with regard to the claimed invention.

FIG. 8 shows placement of a context menu according to another aspect of the invention.

DETAILED DESCRIPTION

This invention relates to methods, systems and user interfaces for using context-specific menus to perform actions pertaining to a particular object having a corresponding screen representation. The following description is divided into various subsections: Definitions; Illustrative Operating Environment; Enhanced On-Object Context Menus; Additional Aspects; and Conclusion. These subsections are for the reader's convenience and not intended as limitations upon the invention.

Definitions

Unless otherwise indicated, various terms as used in this specification and in the claims have the following meanings:

Action: A modification of, or a command, function, or other activity relating to, an object. An action includes, inter alia, creating an object.

Icon: A small on-screen pictorial representation. Although icons are primarily non-textual, they may include letters or numbers.

(Electronic) Ink: A sequence or set of points, displayed or displayable on a CRT, LCD, or other display device, which were created by moving a stylus, mouse or other input device so as to mimic pencil and paper or other types of non-electronic writing or drawing. The electronic ink may include additional properties and methods resulting in a rich representation of the ink. Also, the ink may be stored as an ink object which may include properties and/or methods.

Object: As commonly used in the art, an object includes combinations of computer code and data used to represent quantities or concepts with which a user can interact. An object may have variables that can have values, and may also have associated procedures, methods and other functions.

Text: Letters, words, sentences, paragraphs, etc. having characters that can be represented by unique codes (e.g., ASCII, Unicode, etc.). Text also includes non-letter characters and symbols.

Illustrative Operating Environment

Figure 1:
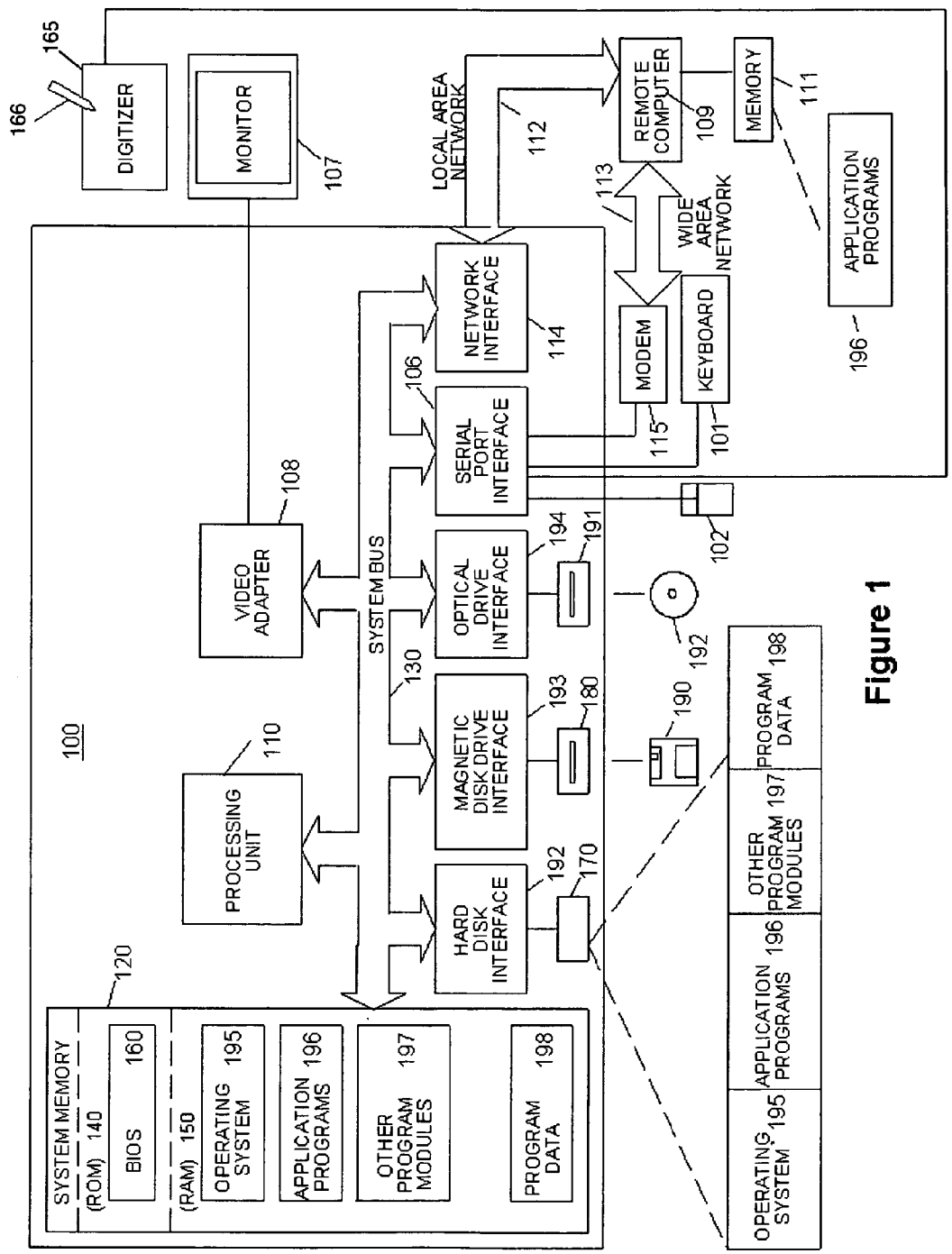
FIG. 1 shows a schematic diagram of a general-purpose digital computing environment that can be used to implement various aspects of the invention.

Aspects of the invention may be implemented with instructions that can be executed on a computing device. Accordingly, an illustrative computing environment for executing such instructions will be described. Aspects of the invention may be described in the general context of computer-executable instructions, such as program modules, executed by one or more computing devices. Generally, program modules include routines, programs, objects, components, data structures, etc. that perform particular tasks or implement particular abstract data types. Typically, the functionality of the program modules may be combined or distributed as desired. Because the invention may be implemented using software, it may useful to briefly discuss the components and operation of a typical programmable computer on which various aspects of the invention may be employed. One illustrative computer system is illustrated in FIG. 1. The system includes a general-purpose computer 100. This computer 100 may take the form of a personal digital assistant; a tablet, desktop or laptop personal computer; a network server, or the like. Computer 100 typically includes at least some form of computer readable media. Computer readable media can be any available media that can be accessed by the computer 100. By way of example and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by the computer 100 using appropriate hardware and interfaces. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

With reference to FIG. 1, computer 100 includes a processing unit 110, a system memory 120, and a system bus 130 that couples various system components including the system memory to the processing unit 110. The system bus 130 may be any of several types of bus structures including a memory bus or memory controller, a peripheral bus, and a local bus using any of a variety of bus architectures. The system memory 120 may include read only memory (ROM) 140 and random access memory (RAM) 150.

A basic input/output system 160 (BIOS), containing the basic routines that help to transfer information between elements within the computer 100, such as during start-up, may be stored in the ROM 140. The computer 100 may also include any or all of a hard disk drive 170 for reading from and writing to a hard disk (not shown), a magnetic disk drive 180 for reading from or writing to a removable magnetic disk 190, and an optical disk drive 191 for reading from or writing to a removable optical disk 192 such as a CD ROM, DVD or other optical media. The hard disk drive 170, magnetic disk drive 180, and optical disk drive 191 may be connected to the system bus 130 by a hard disk drive interface 192, a magnetic disk drive interface 193, and an optical disk drive interface 194, respectively. The drives and their associated computer-readable media provide nonvolatile storage of computer readable instructions, data structures, program modules and other data for the computer 100. It will be appreciated by those skilled in the art that other types of computer readable media that can store data that is accessible by a computer, such as magnetic cassettes, flash memory cards, digital video disks, Bernoulli cartridges, random access memories (RAMs), read only memories (ROMs), and the like, may also be used in the example operating environment. Also, it should be appreciated that more portable embodiments of the computer 100, such as a tablet personal computer or personal digital assistant, may omit one or more of the computer storage media devices discussed above.

A number of program modules can be stored on the hard disk drive 170, magnetic disk 190, optical disk 192, ROM 140 or RAM 150, including an operating system 195, one or more application programs 196, other program modules 197, and program data 198. A pen digitizer 165 and accompanying pen or stylus 166 may be provided in order to digitally capture freehand input. Although a direct connection between the pen digitizer 165 and the serial port interface 106 is shown, in practice, the pen digitizer 165 may be coupled to the processing unit 110 directly, or via a parallel port (or other) interface and the system bus 130 as known in the art. Furthermore, although the digitizer 165 is shown apart from the monitor 107, it is preferred that the usable input area of the digitizer 165 be co-extensive with the display area of the monitor 107. Further still, the digitizer 165 may be integrated in the monitor 107, or may exist as a separate device overlaying or otherwise appended to the monitor 107. A user might also enter commands and information into the computer 100 through input devices such as a keyboard 101 and pointing device 102. Other input devices (not shown) may include a microphone, joystick, game pad, satellite dish, scanner or the like. These and other input devices are often connected to the processing unit 110 through a serial port interface 106 that is coupled to the system bus, but may be connected by other interfaces, such as a parallel port, game port or a universal serial bus (USB). Further still, these devices may be coupled directly to the system bus 130 via an appropriate interface (not shown). Monitor 107 or other type of display device is also connected to the system bus 130 via an interface, such as a video adapter 108. In addition to the monitor, computers may include other peripheral output devices (not shown), such as speakers and printers.

The computer 100 may also operate in a networked environment using logical connections to one or more remote computers, such as a remote computer 109. The remote computer 109 can be a server, a router, a network PC, a peer device or other common network node, and may include many or all of the elements described above relative to the computer 100, although only a memory storage device 111 has been illustrated in FIG. 1. The possible logical connections depicted in FIG. 1 include a local area network (LAN) 112 and a wide area network (WAN) 113. Such networking environments are commonplace in offices, enterprise-wide computer networks, intranets and the Internet.

When used in a LAN networking environment, the computer 100 may be connected to the local network 112 through a network interface or adapter 114. When used in a WAN networking environment, the computer 100 typically includes a modem 115 or other means for establishing a communications over the wide area network 113, such as the Internet. The modem 115, which may be internal or external, is connected to the system bus 130 via the serial port interface 106. In a networked environment, program modules depicted relative to the computer 100, or portions thereof, may be stored in the remote memory storage device.

It will be appreciated that the network connections shown are exemplary and other techniques for establishing a communications link between the computers can be used. The existence of any of various well-known protocols such as TCP/IP, Ethernet, FTP, HTTP and the like is presumed, and the system may be operated in a client-server configuration to permit a user to retrieve web pages from a web-based server. Any of various conventional web browsers can be used to display and manipulate data on web pages.

Figure 2:
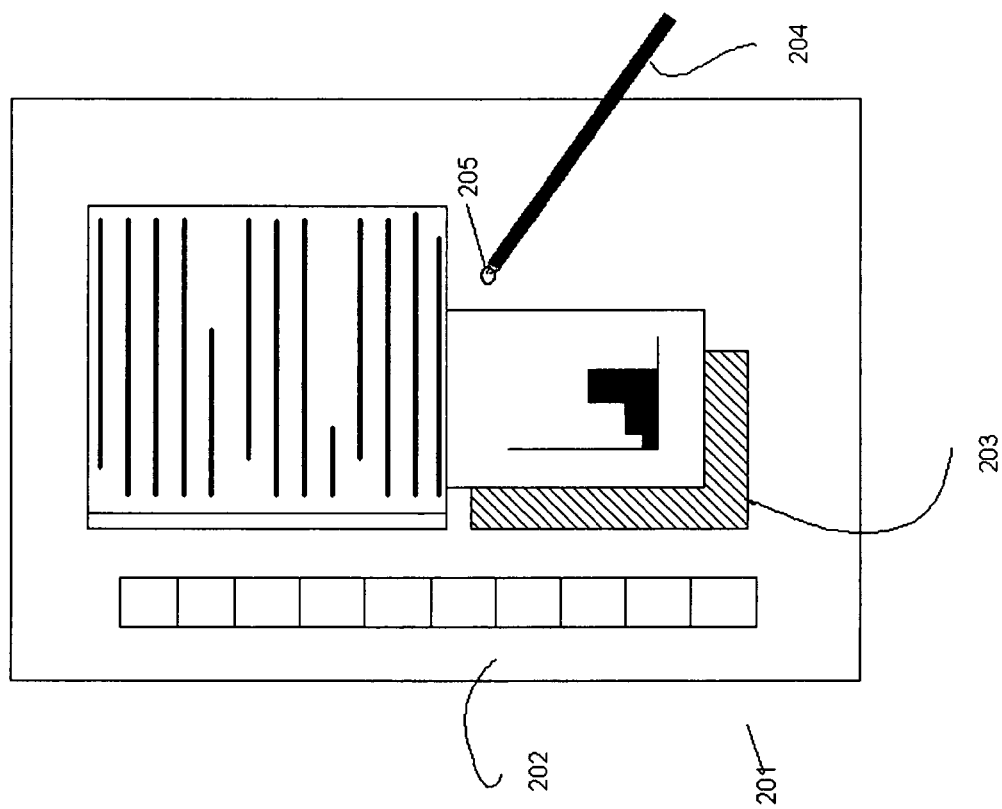
FIG. 2 shows a plan view of a tablet computer and stylus that can be used in accordance with various aspects of the present invention.

FIG. 2 illustrates a tablet PC 201 that can be used in accordance with various aspects of the present invention. Any or all of the features, subsystems, and functions in the system of FIG. 1 can be included in the computer of FIG. 2. Tablet PC 201 includes a large display surface 202, e.g., a digitizing flat panel display, preferably, a liquid crystal display (LCD)

screen, on which a plurality of windows 203 may be displayed. Using stylus 204, a user can select, highlight, and/or write on the digitizing display surface 202. Examples of suitable digitizing display surfaces 202 include electromagnetic pen digitizers (such as, e.g., pen digitizers available from Wacom Technology Corporation of Vancouver, Washington). Other types of pen digitizers, e.g., optical digitizers, may also be used. Tablet PC 201 interprets gestures made using stylus 204 in order to manipulate data, enter text, create drawings, enter system commands and/or execute conventional computer application tasks such as spreadsheets, word processing programs, and the like.

The stylus 204 may be static, whereby pressure upon (or other physical contact with) the display screen or other digitizing surface is necessary to effect input. Stylus 204 may also be dynamic, with distance from and/or orientation with regard to the screen (or other digitizing surface) being detectable. This could facilitate, e.g., "hovering," whereby a cursor is located on the screen by holding the stylus over a location without actually touching the screen or other digitizing surface. Stylus 204 could also be equipped with one or more buttons or other features to augment its selection capabilities. In one embodiment, the stylus 204 could be implemented as a "pencil" or "pen", in which one end constitutes a writing portion and the other end constitutes an "eraser" end, and which, when moved across the display, indicates portions of the display are to be erased. Stylus 204 may also have one or more buttons that correspond generally to "left-click," "right-click" or other buttons often found on a computer mouse; one or more of these buttons might be programmable by a user.

Other types of input devices, such as a mouse, trackball, or even a keyboard, could also be used with tablet PC 201. Additionally, a user's own finger could be the stylus 204 and used for selecting or indicating portions of the displayed image on a touch-sensitive or proximity-sensitive display. Region 205 shows a feedback region or contact region permitting the user to determine where the stylus 204 has contacted the display surface 202.

Enhanced on-Object Context Menus

Although the invention will primarily be described with regard to a computer configured for user input with a stylus, the invention may also be advantageously implemented with regard to other manners of user input (including mice, trackballs, touch pads, etc.). Accordingly, except where specifically claimed, the invention is not limited to stylus-based user input.

Using a device such as the tablet PC 201 and stylus 204 shown in FIG. 2, a user may create (or retrieve from memory or another source) an object by moving the stylus across a display having an incorporated digitizer. The object could be displayed on the screen as ink, or otherwise have a corresponding graphical (or even textual) representation. The object (and its associated ink or other visual representation) could represent handwriting, which the user may later convert to text by way of one or more handwriting recognition engines. The object may be part of a drawing figure which the user is sketching. The object may be a pre-existing text document. The object may be of some other type. Regardless of the type of object (or objects) involved, the user may need to perform one or more actions with regard to that object (or objects). To do so, the object(s) to be acted upon should be identified. Such identification could occur in various manners, as are known in the art. As one alternative, the user might highlight the visual representation of the object(s) of interest. The user might do so by pressing a particular button on the stylus and moving the stylus across the visual representation of the object(s). Highlighting might also be invoked by first performing a designated stylus gesture. As another alternative, the user might use the stylus to create an outline surrounding the visual representation of the object(s). As yet another alternative, the user may have created the object within an application program that looks to the most recently modified object when an action is requested. As a still further alternative, the object's visual representation may have tags or other associated in-document indicators (e.g., a small square, circle or other image located on or near the object); the user might select the object by tapping on or otherwise selecting the tag.

Figure 3:
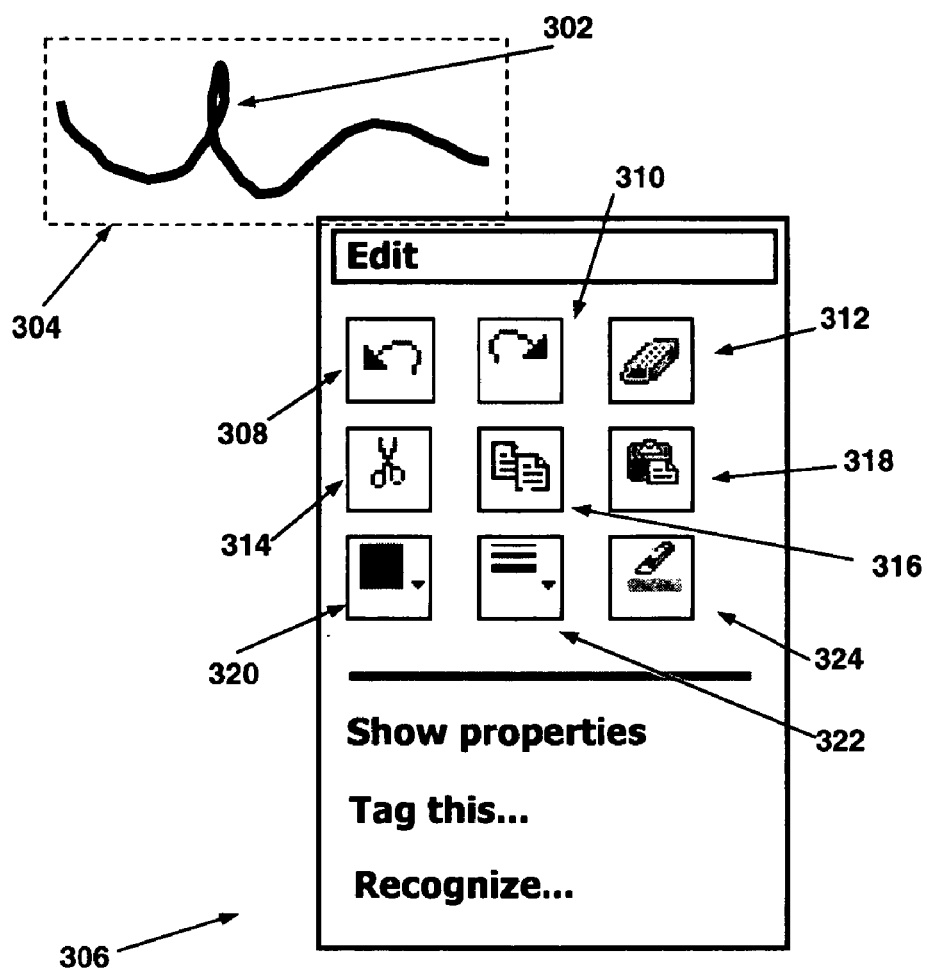
FIG. 3 shows a context menu according to one aspect of the invention.
Figure 5:
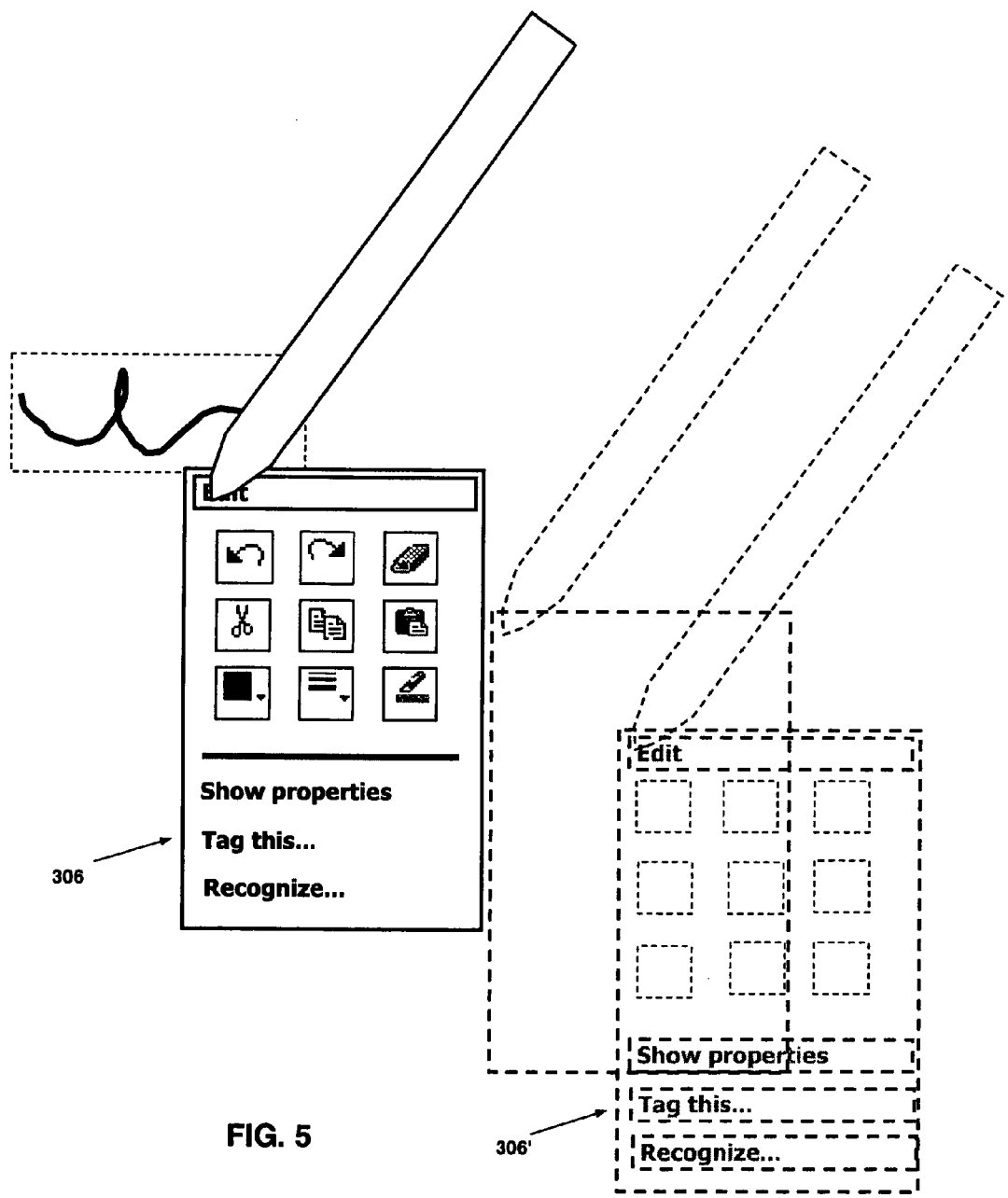
FIG. 5 shows movement of a context menu according to another aspect of the invention.

To perform the desired action upon the object, an aspect of the present invention allows the user to initiate a context menu for the object. The context menu may present the user with all or a subset of all the possible actions applicable to the object. FIG. 3 shows a context menu according to one embodiment of the invention. The user has created an object having associated ink 302, selected the object by drawing outline 304 or otherwise selecting the object, and then initiated context menu 306. The user may have initiated context menu 306 by performing a certain stylus gesture, by pressing a particular button on the stylus (e.g., a button analogous to a "right-click" with a mouse), or in some other manner known in the art. Notably, the invention does not require that the user first identify the object to be acted upon and then initiate context menu 306. As one alternative, the user could first initiate context menu 306 and then be prompted to identify the object to be acted upon. As another alternative, the user may have previously activated context menu 306, and then "pinned" it to the active document. In such an alternative embodiment, context menu 306 might remain at a corner of the display (or other unobtrusive location), and then be "dragged" over ink associated with the object to be acted upon. This embodiment is also shown in FIG. 5, with the menu 306' representing the menu prior to being moved to ink 302.

Context menu 306 presents the user with various possible actions represented by icons 308-324. These icons may be the same icons that are otherwise familiar to the user from prior use of the program, or from other programs. By way of example, FIG. 3 shows icons that may be applicable to one type object in an application program compatible with the WINDOWS XP operating system available from Microsoft Corporation of Redmond Wash.: undo previous action (308); redo (310); erase (312); cut (314); copy (316); paste (318); change color (320); change thickness (322); and change highlighting (324). It will be appreciated that the icons shown are merely examples, and other icons could be included in addition to (or instead of) those shown. As indicated in FIG. 3, context menu 306 could also include textual menu choices.

Figure 4A:
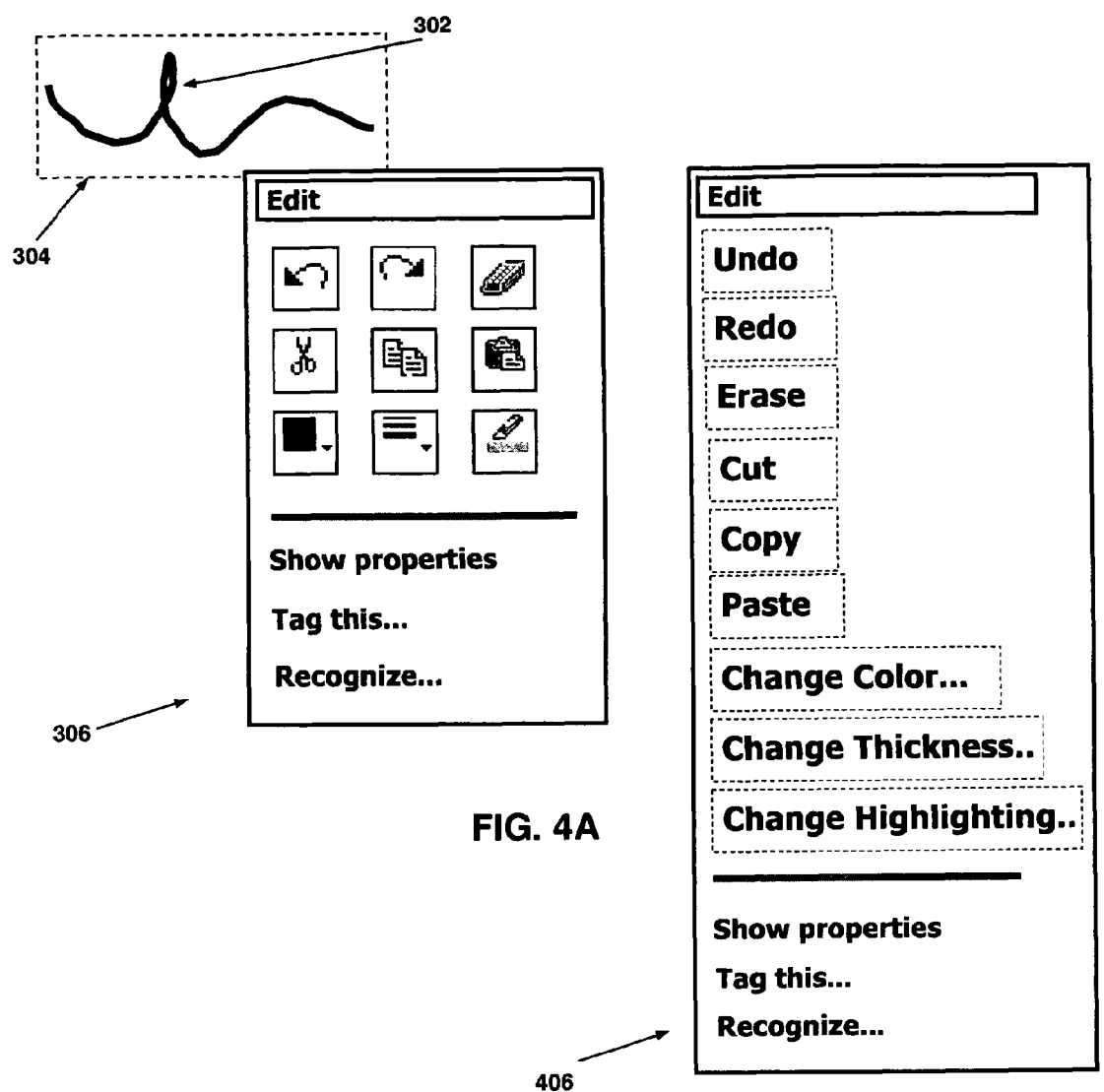
FIGS. 4A-4D show the advantages of the context menu of FIG. 3 over other possible solutions.
Figure 4B:
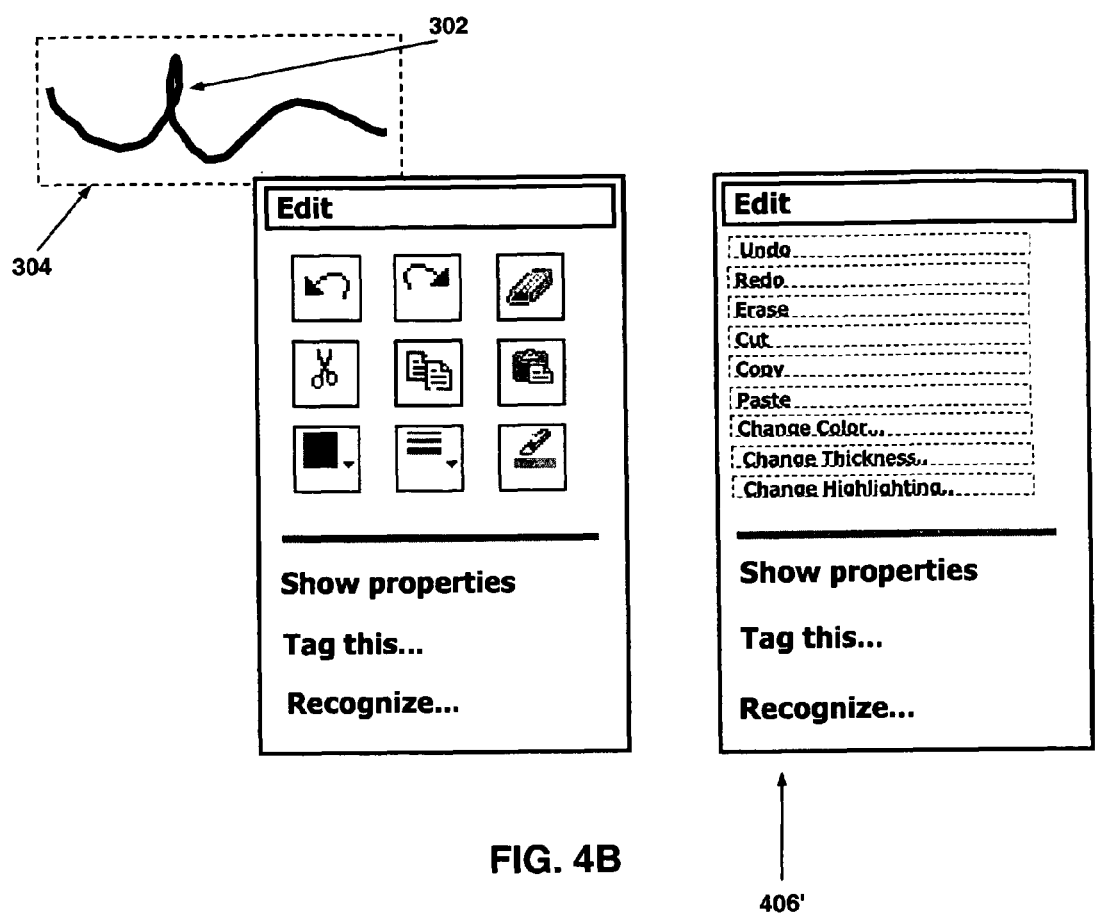
Figure 4C:
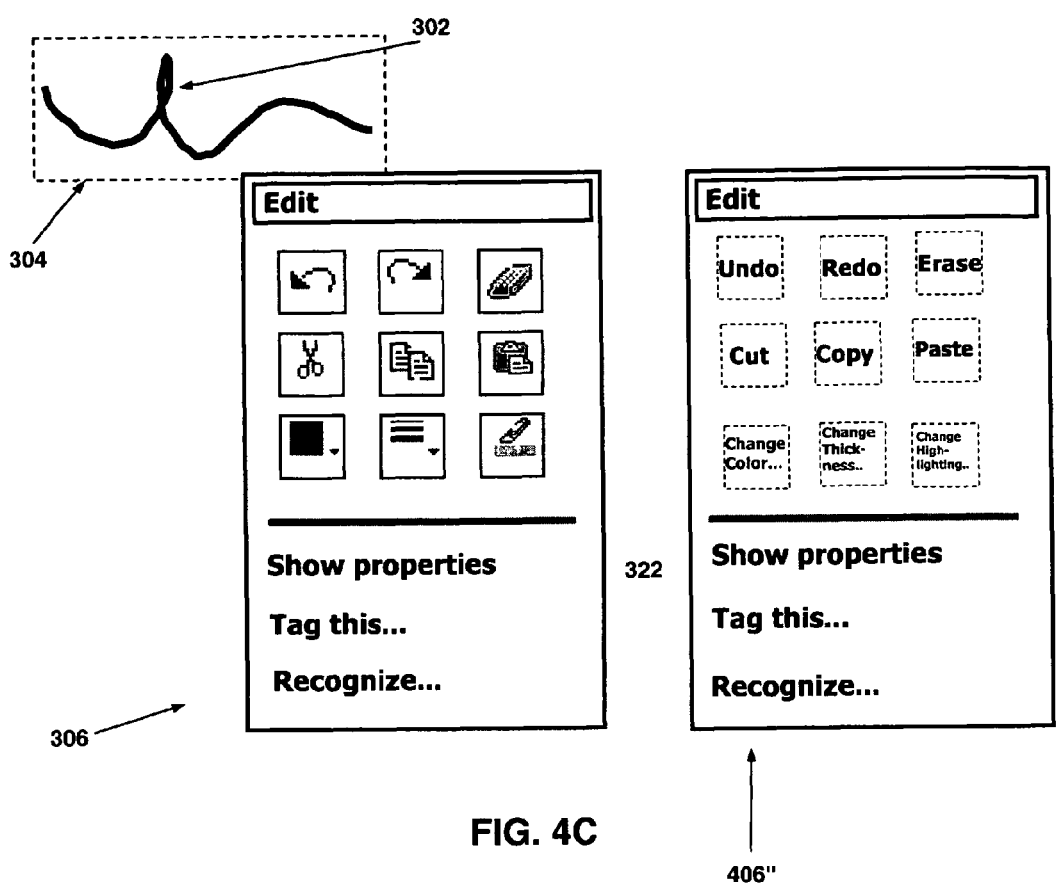
Figure 4D:
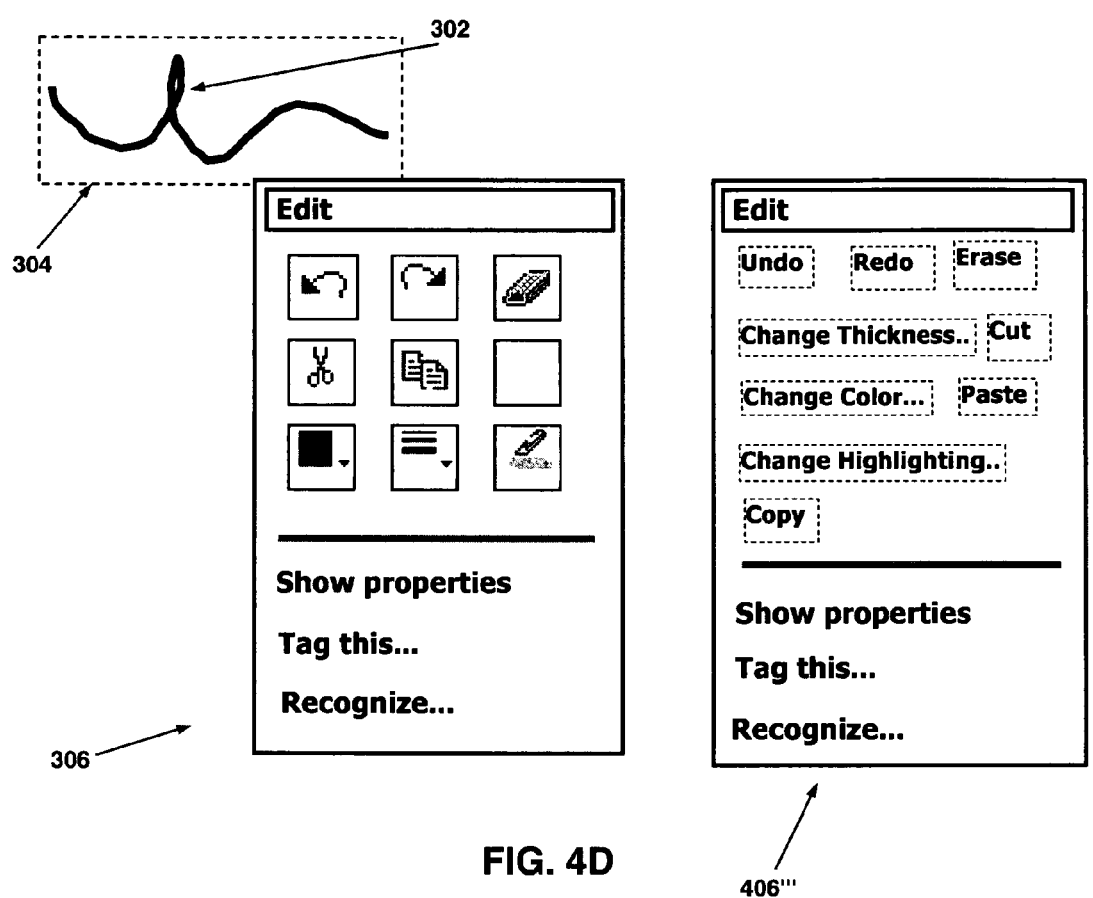

Aspects of the present invention incorporate icons into a context menu to display a larger number of menu choices in a more compact area. In this manner, a user is presented with a larger number of possible actions, while at the same time minimizing necessary hand or wrist movement. In some embodiments, the icons may be size-optimized for selection with a stylus user input device. In one example, as seen in FIGS. 4A-4D, differences in geometry of icons versus geometry of text allows a larger number of menu selections to be presented in a smaller screen area. More specifically, icons are more easily contained in regions that are generally uniform in overall size and shape. Moreover, icons can more easily be allocated screen areas that have a non-extreme aspect ratio. In other words, an icon can be allocated to a screen region with a width that is generally equal to its height, such as a square or circle. This allows for more efficient use of area within a context menu, and provides "targets" that are easier for a user to select with a stylus. For example, FIG. 4A shows context menu 306 in comparison to a context menu 406 having textual menu choices in place of the icons in menu 306. The dashed line surrounding each textual menu choice indicates the target area within which a stylus must be placed to select that menu option. As is evident, menu 406 is significantly larger, and would require significantly larger hand/wrist movement to move though the full range of options. Of course, it is possible to reduce the size of the text (and the corresponding target areas) to crowd more options into a smaller area. As shown in FIGS. 4B and 4C, however, this approach has its own disadvantages. If the height of each textual menu choice is reduced so as to fit into the same area as icons 308-324 (as shown by menu 406' in FIG. 4B), the significantly thinner target areas would be more difficult for a user to successfully select with a stylus, and would also be more difficult to see. If the width of each textual menu choice is reduced so as to allow multiple columns of menu options (as shown by menu 406" in FIG. 4C), the options are much less readable. As shown with menu 406''' in FIG. 4D, it is also possible to variably and moderately reduce both size and width of target areas for textual menu choices, and then distribute those menu choices in a "patchwork" fashion. However, this is also less easily readable, and could present difficulties in terms of software coding and performance. Moreover, many menu options would not be satisfactorily expressible in short words, and thus it might not always be possible to "patchwork" some combinations of options while maintaining a satisfactory minimum target size for each option.

The menu choices (and corresponding icons) presented in a context menu can represent those commands or actions most likely to be needed for the object of interest. The determination of which icons to include can be made in various manners. As one alternative, some types of objects may have standard or default actions/icons displayed. As another possibility, some of the actions/icons could be standard for a given object type, with the remainder of the actions/icons determined based on user selection. For example, the user may initially configure the application in which an object is created to provide certain context menu choices. As another possibility, some of the context menu actions/icons could be standard for a particular object, with other actions/icons representing actions the user most recently chose from a main menu or toolbar. Using FIG. 3 as an example, "undo," "redo," "cut," "copy" and "paste" might be standard commands for objects such as those represented by ink 302, with the remaining icons representing commands the user has previously chosen from another menu or toolbar. Similarly, the order of displayed icons could vary. As one example, the icons could be reordered so as to place the most recently chosen (or most frequently chosen) actions first. The user might also configure the application software to present icons in a certain order.

Additional Aspects

FIGS. 6A through 6I illustrate additional aspects of the invention. As set forth below, hand and wrist motion may also be minimized through the use of cascading levels of context menus. Unlike conventional cascading menus, which may require a user to traverse an entire series (or tree) of cascaded menus for each menu choice, the present invention permits a user to cancel one or more lower levels of cascaded context menus while leaving one or more higher level context menus in place. Cascading context menus may thus be advantageously configured to allow rapid traversal between sets of menu options. The sets can be grouped by frequency of use, by user designation, or in another manner.

Figure 6A:
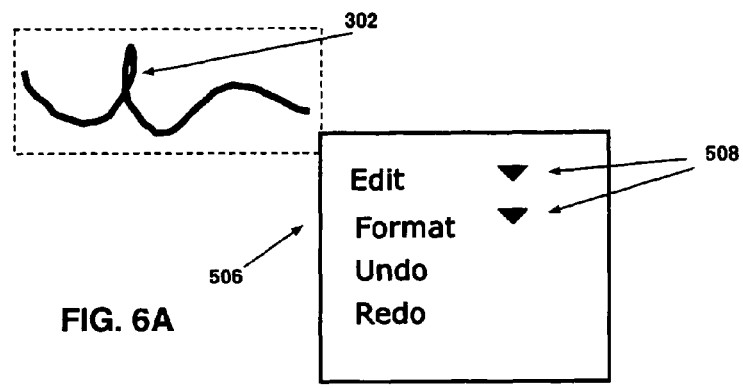
FIGS. 6A-6I show cascading levels of context menus according to another aspect of the invention.
Figure 6B:
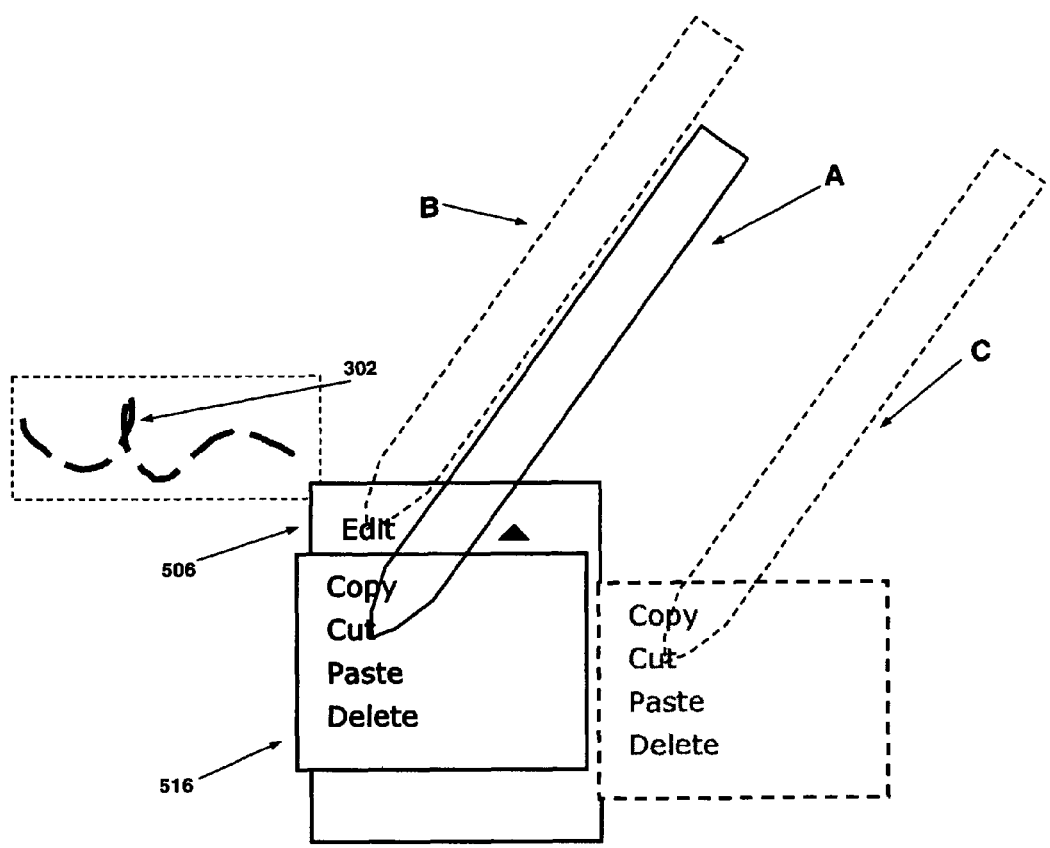

FIG. 6A shows a context menu 506 for ink 302. The user may have invoked context menu 506 in various manners, as previously described. Context menu 506 contains four choices identified by text: "Edit"; "Format"; "Undo"; and "Redo." These menu choices are merely examples for the purpose of illustrating this aspect of the invention, and other menu choices representing other actions could be implemented. Similarly, four choices are displayed so as not overly obscure the drawing, but more or fewer choices could be presented. As seen in FIG. 6A, two of the choices in context menu 506 have an indicator 508 showing that additional choices are available in a lower level menu. For example, and as shown in FIG. 6B, selecting "Edit" causes display of lower level context menu 516. Menu 516 displays four menu choices (or options) which are logical extensions of the original menu choice ("edit"): "cut," "copy," "paste" and "delete." As also shown in FIG. 6B, the orientation of indicator 508 may change to indicate that the menu choice "edit" has been expanded to show a lower level context menu having related choices.

Context menu 516 may also be displayed generally in line with context menu 506, beginning near the location of the stylus tip (or cursor moved by other pointing device) used to select "edit." As also shown in FIG. 6B, this reduces hand and wrist motion from what would be needed for conventionally cascaded menus, which typically expand to the side. The solid outline of a stylus labeled "A" represents the position of the stylus to select "cut." The dashed outline of the stylus labeled "B" represents the position of the stylus to select "edit." The dashed outline of the stylus labeled "C" represents the position of the stylus to select "cut" in a conventionally placed cascading menu. Although the placement of menu 516 may obscure some choices in one or more higher level menus (such as menu 506), the original menu choice ("edit") from the higher level menu is still visible. Moreover, the user may return to the higher level menu 506 by again tapping or otherwise selecting "edit" or its indicator 508. Upon a second selection of "edit" or its indicator 508, menu 516 would disappear, context menu 506 would remain, and indicator 508 would return to its original orientation.

Figure 6C:
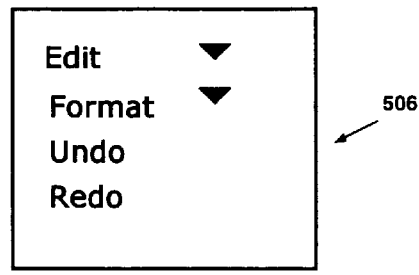
Figure 6D:
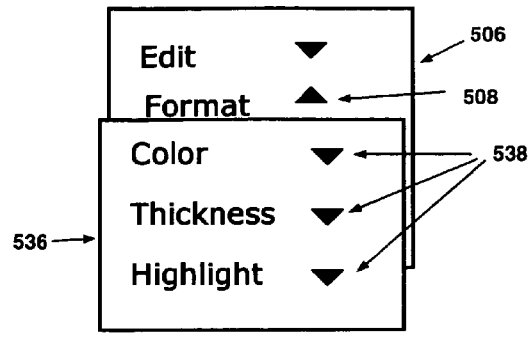
Figure 6E:
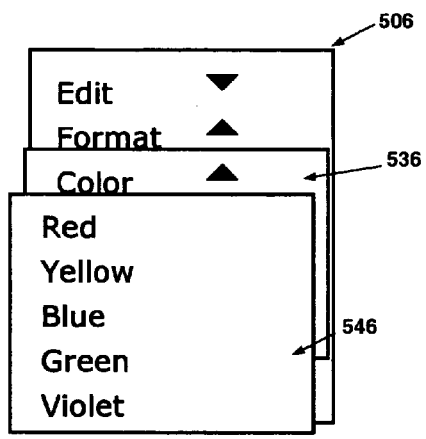

FIGS. 6C through 6G illustrate multiple levels of cascaded context menus and the ease with which a user may traverse between levels of context menus in a cascade. So as not to unnecessarily obscure the drawing, ink 302 is not shown. FIG. 6C shows context menu 506 upon initiation by the user. In FIG. 6D, the user then chooses "format," causing second level context menu 536 to cascade below. Indicator 508 in context menu 506 has changed orientation to indicate that "format" has been expanded to show a lower level context menu having related choices. As seen in FIG. 6D, context menu 536 contains three choices (or options) which are logical extensions of the original menu choice ("format"): "color" "thickness," and "highlight." Each of the choices in menu 536 has an indicator 538 showing that additional choices are available in lower level menus. As shown in FIG. 6E, the user has chosen "color" from menu 536. Indicator 538 has changed orientation, and third level context menu 546 has cascaded below. Context menu 546 contains five choices which are logical extensions of the previous menu choice ("color"): "red," "yellow," "blue," "green" and "violet." As is clear from FIG. 6E, the cascaded context menus have been displayed in a minimal area, but each of the user's menu choices in the present cascade ("format" and "color") is still visible.

The user may the traverse back up through the levels of context menus by reselecting a prior menu choice (or its indicator). For example, if the user reselected the "format" choice in FIG. 6E (or its indicator 508), menus 536 and 546 would disappear, but menu 506 would remain. The menus could optionally be configured such that, whenever a user makes a menu choice that does not have an associated lower level menu, the menu having that choice disappears, but all higher level menus remain. For example, if the user chose "blue" in FIG. 6E, menu 546 might disappear, but menu 536 could remain so as to allow further choices from menu 536.

Figure 6F:
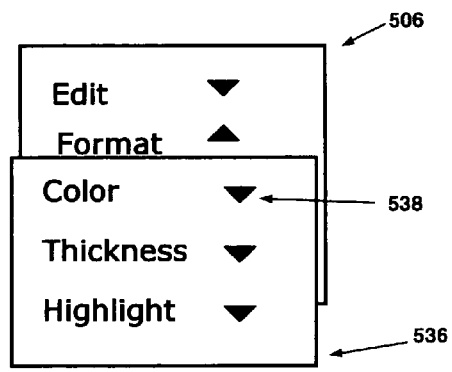
Figure 6G:
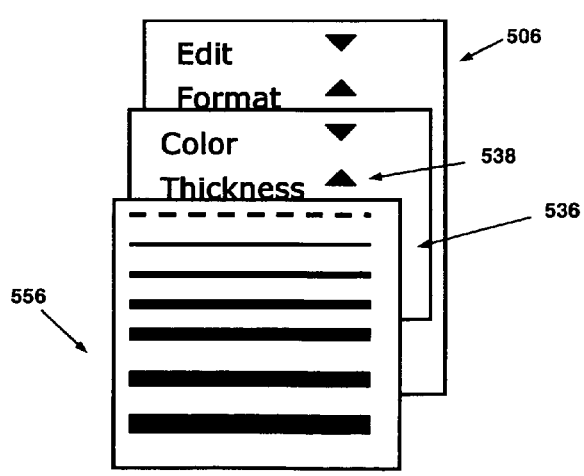

FIG. 6F shows what has occurred after the user closed menu 546. Indicator 538 has returned to its original orientation, and all choices in menu 536 are again visible. As shown in FIG. 6G, the user has now chosen "thickness" in menu 536. Indicator 538 for "thickness" has changed orientation, and third level context menu 556 has cascaded below. Context menu 556 contains seven choices of line thickness or style, which are logical extensions of the previous menu choice ("thickness"). As is clear from FIG. 6G, the cascaded context menus have been displayed in a minimal area, but each of the user's menu choices in the present cascade ("format" and "thickness") is still visible. The user may then make a choice from menu 556, and/or continue to traverse up and down the levels of context menus as many times as may be necessary.

Although FIGS. 6C-6G only show three levels of cascaded context menus, additional levels could be included following the same pattern described. Moreover, the use of cascading levels of context menus is not limited to actions which merely change appearance of a line or other drawing figure. As but one possible example, levels of context menus could be used for mathematical operations. The first level might contain choices for numbers and a choice for a second level menu of mathematical operators. The second level menu may have various basic mathematical operators (e.g., add, subtract, multiply and divide, etc.), as well as one or more choices for lower level menus of specialized operators. As but one example, the second level menu may have a choice called "trig" which, when selected, causes display of a third level menu having various trigonometric functions (e.g., sine, cosine, tangent, etc.). The third level menu may also have one or more choices for even lower level menus of even more specialized trigonometric functions. As but another example, menu levels of commonly used words can be implemented so as to allow construction of simple or commonly used sentences. A first level menu might have choices for nouns and a choice called "verb." Selecting "verb" could open a second level menu having choices for verbs, and a choice called "object" (note that object is used here in a grammatical, and not a software, sense). Selecting "object" might open a third level menu having choices for objects. As but another possible example, a program for drawing electrical circuit schematics may have voltage and current sources on level one, resistors on level two, capacitors on level three, transistors on level four, etc. Numerous other possibilities exist.

Figure 6H:
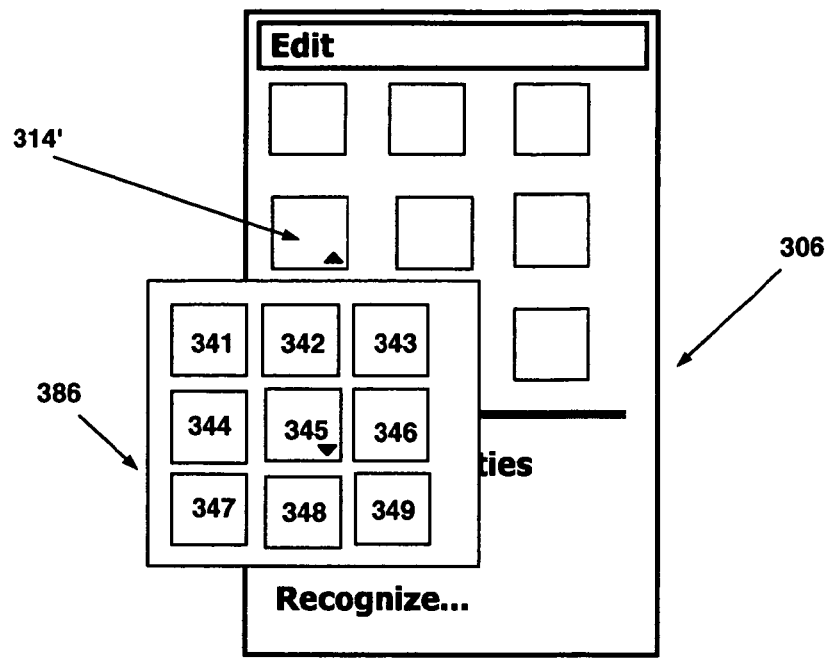
Figure 6I:
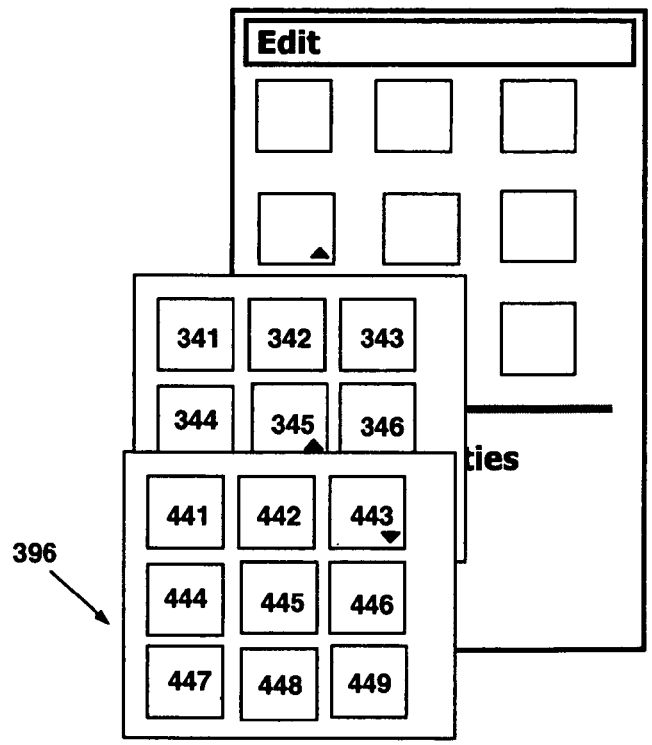

The aspects of the invention illustrated in FIGS. 6A-6G can also be incorporated into context menus having icons. As shown in FIG. 6H, selecting icon 314' may cause display of lower level menu 386. Lower level menu 386 offers choices represented by icons 341-349, and icon 345 has an indicator showing that an additional level of choices is available. Selection of icon 345 causes display of menu 396, which has choices represented by icons 441-449. Even further levels of menus could be added.

Figure 7A:
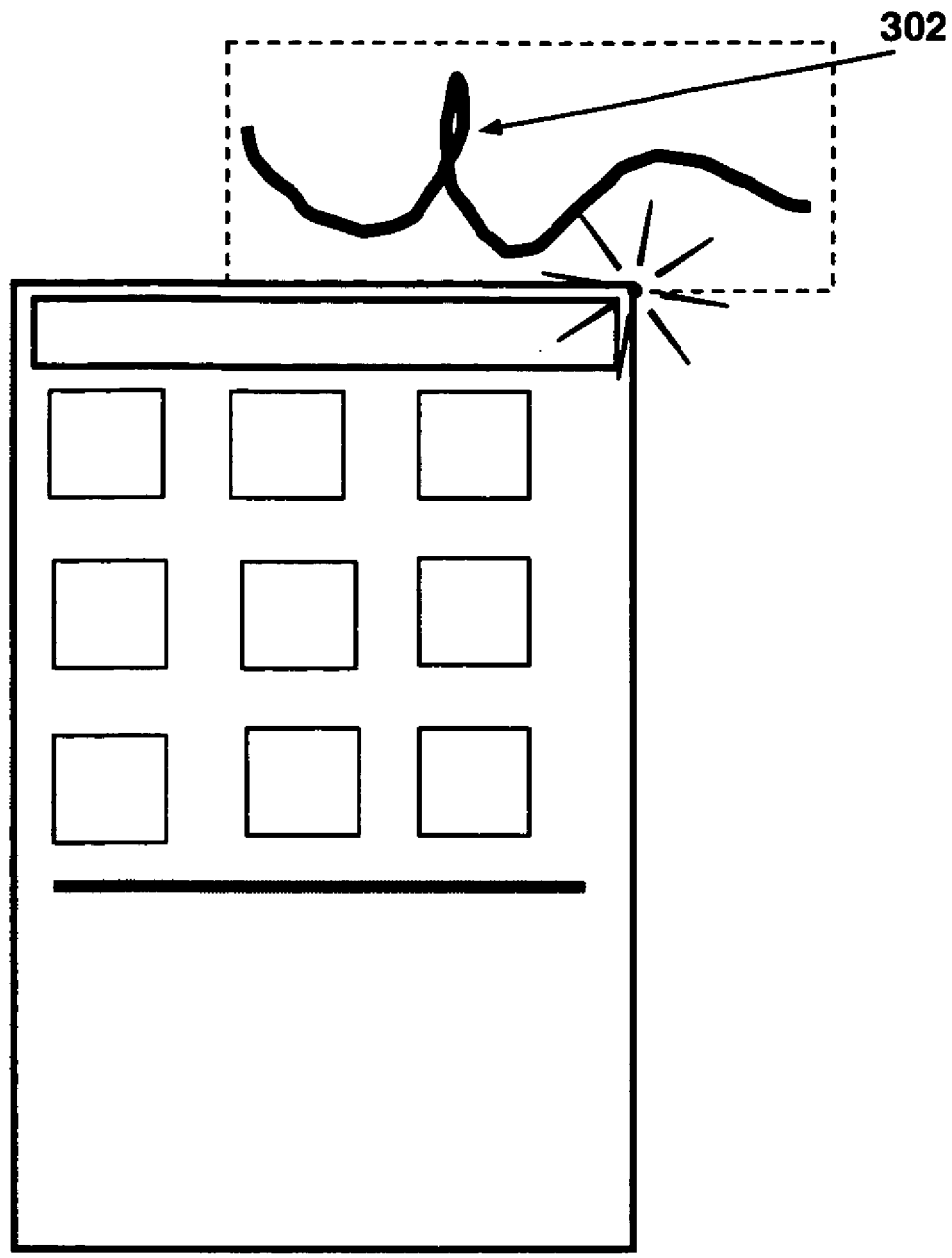
FIGS. 7A & 7B show placement of a context menu according to another aspect of the invention.
Figure 7B:
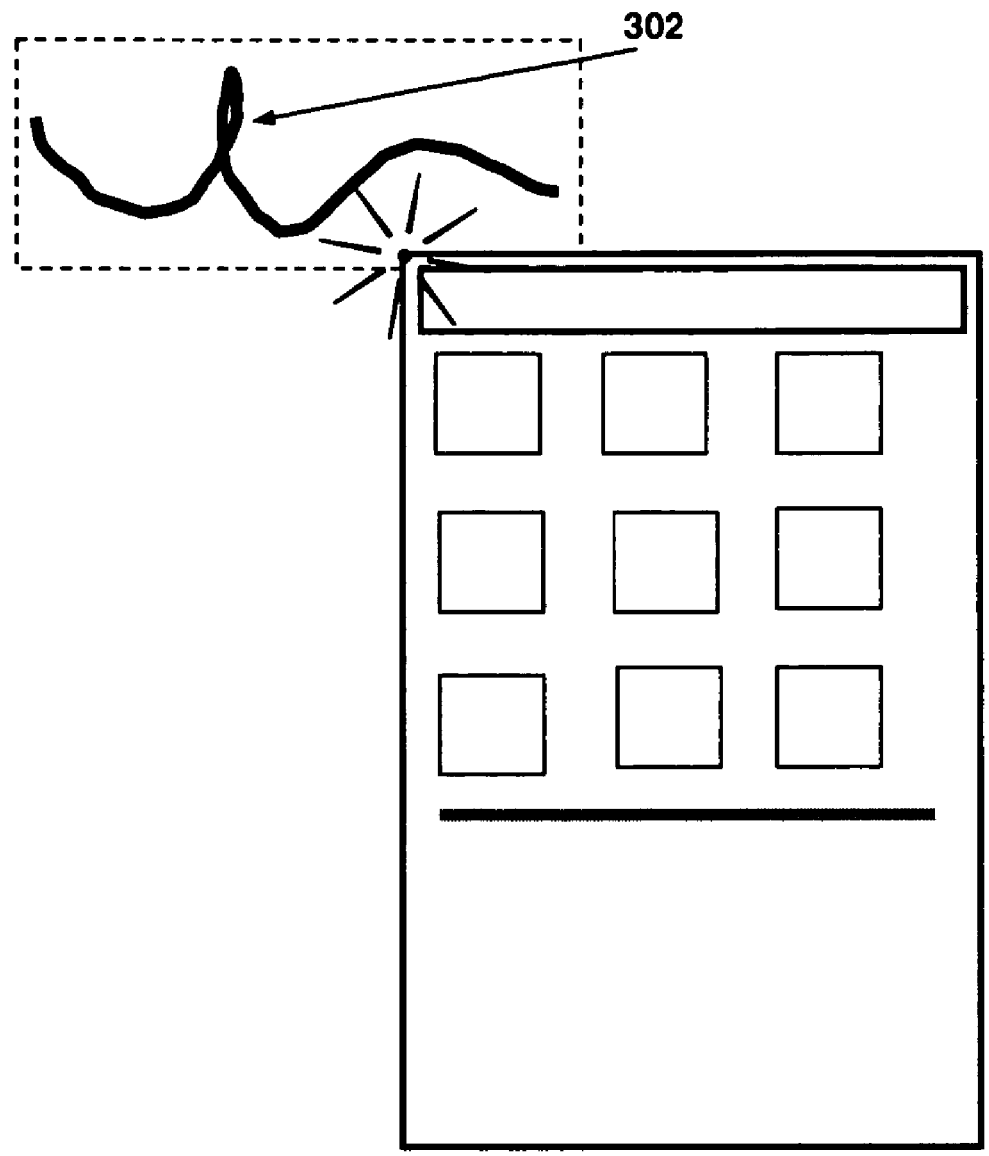

An additional aspect of the invention accommodates the right- or left-handedness of the user, and orients the context menu so as to minimize hand and wrist motion. For example, if the user is right handed, the context menu might be displayed to the left of the stylus when the context menu is initiated. The large star in FIG. 7A represents the location of the cursor when the context menu is initiated. Because the cursor is typically located near the end of the stylus with which the user is pointing to the screen, the cursor provides a reference point for a likely location of the user's hand (which is holding the stylus) with respect to the screen, if it is assumed the user is right handed. In this manner, the context menu can be placed so that the hand of a right-handed user does not obscure the context menu. Conversely, if the user is left-handed, the context menu might be displayed to the right of the stylus when the context menu is initiated, shown in FIG. 7B. The handedness of the user might be set by the user when initially configuring an application or operating system program; might be detected based on the orientation of the stylus; or might be established in some other manner. Similarly, stylus orientation could be used to adjust context menu positioning in other situations. As illustrated in FIG. 8, the user might be reviewing a spreadsheet, and using the stylus to "check off" cells as they are reviewed. As shown by the dashed outline of a stylus, the user may be holding the stylus so as to maximize his or her ability to see a particular row in the spreadsheet. The orientation of the stylus is detected, and the context menu generated above the selected object.

Figure 9:
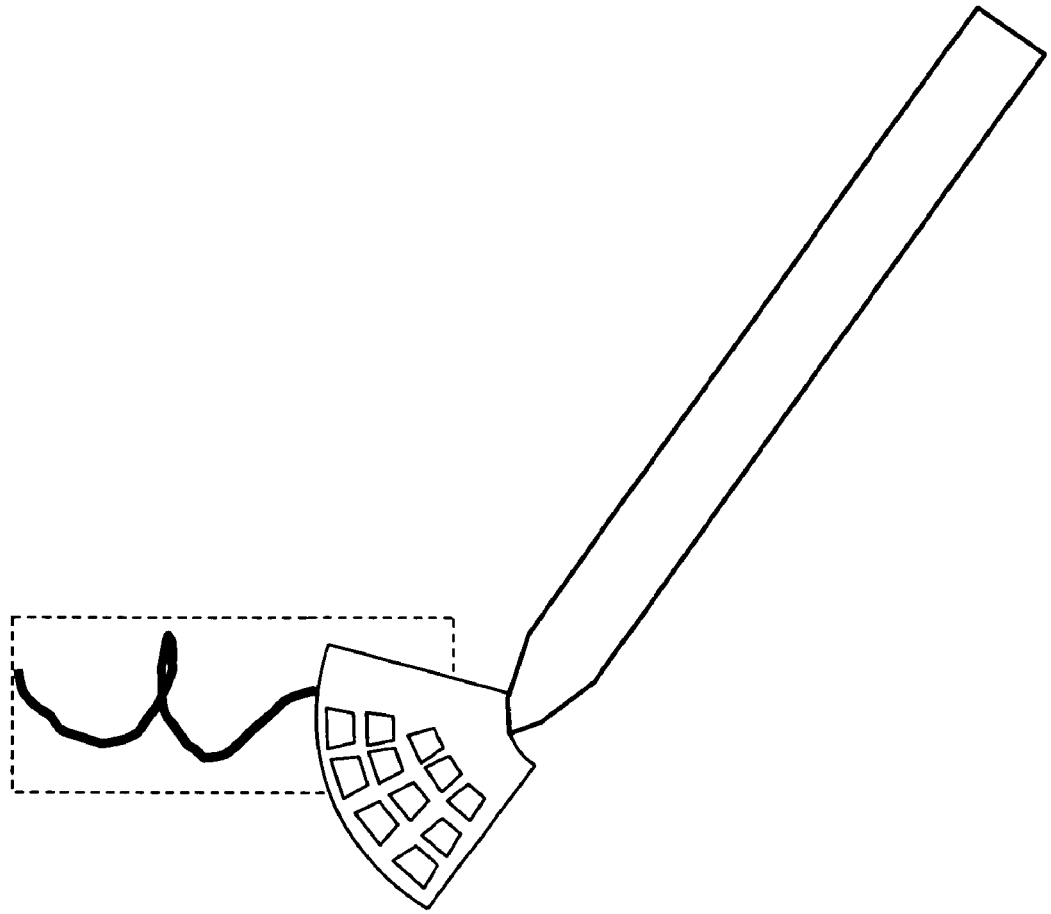
FIG. 9 shows a non-rectilinear context menu according to another aspect of the invention.

In other embodiments, the context menu need not be rectilinear. As shown in FIG. 9, the context menu and icons could be arranged in an arc-like or other fashion so as to be easily reachable by the user without moving his or her hand or wrist.

Conclusion

Although several examples of carrying out the invention have been described, those skilled in the art will appreciate that there are numerous variations and permutations of the above described methods, user interfaces and other aspects of the invention that fall within the spirit and scope of the invention as set forth in the appended claims. In addition to the alternatives and variations already discussed, further variations are possible and within the scope of the invention. For example, the regions, buttons and other features of the described context menus can be rearranged, combined or otherwise modified, and/or additional features added. These and other modifications are within the scope of the invention, which is only to be limited by the attached claims.

What is claimed:
1. A method, comprising:
   displaying a first context menu in response to receiving a user request to display menu options corresponding to actions performable with regard to an object;
   displaying one or more additional context menus in response to at least one selection in the first context menu or an additional context menu, the one or more additional context menus displaying menu options corresponding to actions performable with regard to the object, wherein the first context menu and the one or more additional context menus form a cascade, the first context menu and the one or more additional context menus in the cascade remaining at least partially visible, wherein the one or more additional context menus are displayed in close proximity to, but without obscuring, the context menu option from the first context menu or an additional context menu that was selected to cause display of the corresponding additional context menu;
   receiving a selection of a menu option from a context menu in the one or more additional context menus; and
   discontinuing display of the context menu containing the selected menu option in response to the selection of the menu option, wherein the selected menu option does not have an associated lower level menu, the display of the context menu containing the selected menu option being discontinued while continuing display of the first context menu.

2. The method of claim 1 wherein the user request to display menu options comprises receiving a request initiated with a stylus, and wherein the at least one selection in the first context menu or the one or more additional context menus comprises receiving a request initiated with the stylus.

3. The method of claim 2 wherein the stylus includes a user's finger.

4. The method of claim 3 wherein receiving the request initiated with the stylus includes detecting the user's finger in contact with a touch-sensitive surface.

5. The method of claim 2 wherein the first context menu is displayed left of a position where the request was initiated with the stylus when the user is right-handed, and wherein the first context menu is displayed right of the position where the request was initiated with the stylus when the user is left-handed.

6. The method of claim 1 wherein the object is selected for association with the first context menu after the first context menu has been requested for display by the user.

7. The method of claim 1, wherein the display of the context menu containing the selected menu option is discontinued while continuing display of the first context menu and at least one context menu from the one or more additional context menus.

8. A method, comprising:
 displaying a first context menu in response to receiving a user request to display menu options corresponding to actions performable with regard to an object;
 displaying a second context menu in response to a selection in the first context menu, the second context menu displaying menu options corresponding to actions performable with regard to the object, wherein the first and second context menus form a cascade, the first and second context menus in the cascade remaining at least partially visible, wherein the second context menu is displayed in close proximity to, but without obscuring, the first context menu option selected to cause display of the second context menu;
 receiving a selection of a second context menu option from the second context menu; and
 discontinuing display of the second context menu while continuing display of the first context menu in response to the selection of the second context menu option, wherein the second context menu option does not have an associated lower level menu.

9. The method of claim 8 wherein the user request to display menu options comprises receiving a request initiated with a stylus, and wherein the selection of the second context menu option comprises receiving a request initiated with the stylus.

10. The method of claim 9 wherein the stylus includes a user's finger.

11. The method of claim 10 wherein receiving the request initiated with the stylus includes detecting the user's finger in contact with a touch-sensitive surface.

12. The method of claim 9 wherein the first context menu is displayed left of a position where the request was initiated with the stylus when the user is right-handed, and wherein the first context menu is displayed right of the position where the request was initiated with the stylus when the user is left-handed.

13. The method of claim 8 wherein the object is selected for association with the first context menu after the first context menu has been requested for display by the user.

14. A computing device, comprising: one or more processing units; and
 a computer-readable storage medium having computer-executable instructions that when executed by the one or more processing units perform operations comprising:
 displaying a first context menu in response to receiving a user request to display menu options corresponding to actions performable with regard to an object;
 displaying a second context menu in response to a selection in the first context menu, the second context menu displaying menu options corresponding to actions performable with regard to the object, wherein the first and second context menus form a cascade, the first and second context menus in the cascade remaining at least partially visible, wherein the second context menu is displayed in close proximity to, but without obscuring, the first context menu option selected to cause display of the second context menu;
 receiving a selection of a second context menu option from the second context menu; and
 discontinuing display of the second context menu while continuing display of the first context menu in response to the selection of the second context menu option, wherein the second context menu option does not have an associated lower level menu.

15. The computing device of claim 14 wherein the user request to display menu options comprises receiving a request initiated with a stylus, and wherein the selection of the second context menu option comprises receiving a request initiated with the stylus.

16. The computing device of claim 15 wherein the stylus includes a user's finger.

17. The computing device of claim 16 wherein receiving the request initiated with the stylus includes detecting the user's finger in contact with a touch-sensitive surface.

18. The computing device of claim 15 wherein the first context menu is displayed left of a position where the request was initiated with the stylus when the user is right-handed, and wherein the first context menu is displayed right of the position where the request was initiated with the stylus when the user is left-handed.

19. The computing device of claim 14 wherein the object is selected for association with the first context menu after the first context menu has been requested for display by the user.

* * * * *